United States Patent
Nakamori et al.

(10) Patent No.: US 6,537,597 B1
(45) Date of Patent: Mar. 25, 2003

(54) PROCESS FOR PRODUCING SOYBEAN PROTEIN HYDROLYSATE

(75) Inventors: Toshihiro Nakamori, Izumisano (JP); Yoshimi Akasaka, Izumisano (JP); Hirokazu Maeda, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 09/914,998

(22) PCT Filed: Apr. 27, 2000

(86) PCT No.: PCT/JP00/02780

§ 371 (c)(1),
(2), (4) Date: Sep. 7, 2001

(87) PCT Pub. No.: WO01/64047

PCT Pub. Date: Sep. 7, 2001

(30) Foreign Application Priority Data

Feb. 29, 2000 (JP) ......................................... 2000-054476

(51) Int. Cl.⁷ ............................... A23J 3/16; A23J 3/34
(52) U.S. Cl. .......................................... 426/46; 426/430
(58) Field of Search ............................ 426/46, 52, 656, 426/634, 424, 425, 430, 481, 489, 495, 507

(56) References Cited

U.S. PATENT DOCUMENTS 3,830,942 A * 8/1974 Hawley ........................ 426/46
4,757,007 A * 7/1988 Satoh et al. ................. 210/632

FOREIGN PATENT DOCUMENTS

| EP | 408063 | 1/1991 |
| JP | 8-9891 | 1/1996 |
| JP | 11-225686 | 8/1999 |

* cited by examiner

*Primary Examiner*—Ketih Hendricks
(74) *Attorney, Agent, or Firm*—Wenderoth, Lind & Ponack, L.L.P.

(57) ABSTRACT

An object of the present invention is to provide a process for producing a sterilized enzymatic decomposition soybean protein with facilitating separation of a precipitate after decomposition of soybean protein with an enzyme, and with improving a yield of the enzymatic decomposition product, thereby minimizing formation of the dregs upon using in drinks and so on. Said process comprises adding a proteolytic enzyme to a soybean protein solution to effect hydrolysis, heating and cooling the hydrolyzation mixture, separating and removing insolubles from the mixture and heat-sterilizing the resultant supernatant.

3 Claims, No Drawings

PROCESS FOR PRODUCING SOYBEAN PROTEIN HYDROLYSATE

FIELD OF THE INVENTION

The present invention relates to a process for producing a soybean protein hydrolysate. More specifically, it relates to a process for producing a soybean protein hydrolyzed with an enzyme in a high yield with minimizing formation of dregs upon dissolution.

BACKGROUND ART

Products obtained by hydrolyzing proteins with a proteolytic enzyme have better absorbability upon digestion than that of proteins without proteolysis, and are utilized in various fields such as health food and the like. In particular, it is expected to use them in sports drinks, drinks for nutrition, and the like.

Up to now, JP 61-254153 A, JP 1-269499 A, JP 2-23885 A, 4-190797 A, JP 8-322471 A, JP 10-271958 A, etc. disclose processes for producing enzymatic decomposition products obtained by hydrolyzing animal and vegetable proteins with enzymes. In general, after hydrolysis of proteins with an enzyme, heat treatment is carried out in these known processes so as to inactivate the enzyme, sterilizing the products, and so on. In particular, anaerobic thermophilic bacteria often cause problems in these kinds of products and, normally, thorough heat sterilization is required.

In addition, although a water-soluble fraction and a water-insoluble fraction are separated after hydrolysis, conventional drinks containing protein hydrolysates are liable to form a small amount of a precipitate (dregs) during storage and this is a problem. In general, improvement of quality causes decrease in a yield, whereas increase in a yield is liable to form more dregs during storage. This is also a problem.

OBJECTS OF THE INVENTION

One object of the present invention is to provide a process for producing a soybean protein hydrolyzed with an enzyme in a high yield with minimizing formation of dregs upon dissolution.

SUMMARY OF THE INVENTION

The present inventors have studied intensively to solve the above problems. As a result, it has been found that the above problems can be solved by two step heat treatment, wherein, after hydrolysis of a protein with an enzyme, the hydrolyzation mixture is subjected to a step for heating lightly, followed by cooling to separate insolubles before subjecting the mixture to heat sterilization. Thus, the present invention has been completed.

That is, the present invention is a process for producing a soybean protein hydrolysate which comprises hydrolyzing a soybean protein solution with a proteolytic enzyme, heating (a) and cooling the hydrolyzation mixture, separating and removing insolubles from the mixture to obtain a supernatant and heat-sterilizing (b) the supernatant.

In comparison with heat treatment generally employed for inactivating an enzyme or sterilization, the above heating (a) is preferably carried out under such mild conditions that heating time is $10^{5.25-(0.05 \times T)}$ minutes (wherein T is heating temperature (°C.)) or shorter, because heat sterilization (b) is carried out afterward. Inactivation of the enzyme and sterilization can be effected by heat sterilization (b) of the supernatant after separating and removing insolubles.

Preferably, heating (a) is carried out until the temperature rises to 75° C. or higher, and cooling is carried out until the temperature drops to 60° C. or lower. Preferably, insolubles are separated and removed at a pH of the soybean protein solution of 4.0 to 6.2, or the soybean protein solution contains an alkaline earth metal compound or a protein flocculating agent.

DETAILED DESCRIPTION OF THE PREFERRED EMBODIMENTS

As a raw material for preparing the soybean protein solution of the present invention, which is derived from soybeans and is available inexpensively, there can be used soybean milk, concentrated soybean protein, isolated soybean protein, defatted-soybeans, soybean whey protein and the like. Among them, soybean milk or isolated soybean protein is preferred. When concentrated soybean protein or defatted-soybeans is used, separation of "okara (insoluble residue)" after enzymatic decomposition tends to be difficult. And, it takes much time to collect whey protein, and whey protein has an inferior flavor. As an alkali to be used for preparing the soybean protein solution, or adjusting pH of the hydrolyzation mixture, sodium hydroxide can be used. Potassium hydroxide can also be used in view of nutrition. As an acid, preferably, an organic acid such as citric acid is used in view of a flavor.

The concentration of the soybean protein solution to be subjected to the enzymatic treatment is 1 to 30% by weight, preferably 5 to 15% by weight, more preferably 8 to 12% by weight. Even if the concentration is low, it will not be an obstacle to the process itself. However, the productivity is lowered, which causes increase in the production cost of a soybean protein hydrolysate. When the concentration of the soybean protein solution is too high, a large amount of an enzyme is required for decomposing the protein sufficiently. This may be caused by polymerization of protein hydrolysates once formed by hydrolysis one another, and is undesirable.

As the proteolytic enzyme to be used in the present invention (protease), an exoprotease or endoprotease can be used alone or in combination thereof. The enzyme may be that derived from animals, vegetables or microorganisms. Specifically, serine proteases (trypsin, chymotrypsin, etc. derived from animals; subtilisin, carboxypeptidase, etc. derived from microorganisms; etc.), thiol proteases (papain ficin, bromelain, etc. derived from vegetables) and carboxy proteases (pepsin derived from animals) can be used. Further, the specific examples thereof include Protin FN (trade name of protease manufactured by Daiwakasei K. K.) derived from *Aspergillus oryzae*, Actinase (trade name of protease manufactured by Kaken Seiyaku K. K.) derived from *Streptomyces griseus*, Alkalase (trade name of protease manufactured by Novo) derived from *Bacillus licheniformis*, Protin A (trade name of protease manufactued by Daiwakasei K. K.) derived from *Bacillus subtilis*, and the like. In addition, examples of enzyme preparations containing endoproteases include Protease S manufactured by Amano Seiyaku K. K., Protin AC-10 manufactured by Daiwakasei K. K. and the like. Examples of proteolytic enzymes containing exo- and endoproteases include Protease M manufacuted by Amano Seiyaku K. K.

Conditions for hydrolysis of the present invention vary to some extent according to a particular kind of the proteolytic enzyme to be used. However, in general, it is preferred to use the enzyme in an amount sufficient for hydrolyzing soybean protein in a pH range at a temperature effective for the enzyme activity. When pH is 5 to 10, preferably 6 to 9, formation of a salt by neutralization can be reduced and this is desired in view of using the hydrolysate for a salt-restriction diet (e.g., alimental infusion, etc.).

The degree of hydrolysis is about 20 to 98%, more preferably about 50 to 90% in terms of a soybean protein decomposition rate expressed by a solubilization degree of a protein component in 15% trichloroacetic acid. Although time for acting a proteolytic enzyme varies depending upon the activity of a particular proteolytic enzyme to be used and its amount, normally, it may be about 5 minutes to 24 hours, preferably about 30 minutes to 9 hours. When the enzymatic decomposition time is too long, putrefaction is liable to take place.

The hydrolyzed soybean protein solution is subjected to heating (a) and cooling prior to the step for separating and removing insolubles therefrom. This heating (a) is effected lightly in comparison with that for heat sterilization. When this heating is effected excessively so that the heating time is in excess of $10^{5.25-(0.05 \times T)}$ minutes or shorter, a material causing dregs upon dissolution of the decomposed product is formed, presumably, due to formation of a fraction eluted from a precipitated fraction of the soybean protein hydrolysate formed by hydrolysis. This is undesirable. On the contrary, when this heating is not effected, flocculation capability of insolubles is poor, which results in a difficulty in separation between a supernatant and insolubles with a practical continuous separation means. Flocculation capability can be readily judged by, for example, collecting a 10 cc sample of an enzyme hydrolyzation mixture at 25° C., which is resulted from enzymatic decomposition of a soybean protein solution, followed by heat treatment, in a graduated centrifuge tube, centrifuging at 1,500 G for 20 minutes to precipitate a sludge (precipitate) and then comparing the volume of the sludge to that of a sample obtained according to the same manner except that the heat treatment is not effected. Specifically, it is preferred to effect this heating in such a degree that the volume of the former is $\frac{2}{3}$ or less of the latter. The required heating time can be readily determined within the range of 75 to 160° C., preferably 80 to 140° C. Shorter heating time can be employed as a heating temperature is higher. Normally, the heating time (minutes) of $10^{5.25-(0.05 \times T)}$ or longer is sufficient. For example, it is sufficient to raise a temperature up to about 110° C., followed by maintaining this temperature for about 0.01 minute and then cooling.

It is suitable to effect the cooling of the next step so that the temperature is dropped to 60° C. or lower, preferably 30° C. or lower, more preferably 15° C. or lower. When this cooling is omitted, it makes the separation of insolubles difficult. Then, in case of centrifugation, a high centrifugal force or longer holding time is required for separation of insolubles. Namely, when heating and cooling were not carried out prior to separation, longer holding time such as for 20 minutes at 1,500 g was required for separation of insolubles by centrifugation. However, according to the present invention, insolubles can be separated by centrifugation within shorter holding time such as for several seconds to 5 minutes at 1,500 g. Therefore, according to the present invention, continuous centrifugation can be employed, whereas continuous centrifugation is hardly employed in a conventional process. In addition, as to the degree of insolubilization, a larger amount of dregs tend to form as the difference between the heating temperature and that of a cooling medium becomes larger. Then, as the cooling conditions, it is preferred that difference between the heating temperature and that of a cooling medium is larger.

Further, although cooling can be carried out by allowing to stand (naturally cooling), artificial cooling with a cooling medium is preferred because cooling can be carried out quickly to insolubilize components of dregs quickly, thereby facilitating prevention of formation of dregs upon dissolution of the product.

Separation of insolubles can be carried out by a filtration means such as a filter press, membrane filter, or the like. However, normally, centrifugation is employed and, in particular, a continuous centrifugal separator, a liquid cyclone, etc. can be used.

Normally, pH of the hydrolyzation mixture is within the range of 3 to 8. In order to accelerate or improve separation/flocculation capability of the above insolubles, it is suitable that the pH is preferably 4 to 6.2, more preferably 4.5 to 5.5 because insolubles containing undecomposed materials tend to flocculate at about isoelectric point of soybean protein. Alternatively, separation/above flocculation capability can also be accelerate or improved by addition of an alkaline earth metal compound such as a salt, for example, chloride or sulfate, or a hydroxide of calcium, magnesium, etc. or a flocculating agent such as sodium polyacrylate, alginic acid, chitin, chitosan, etc. to the hydrolyzation mixture.

After separation and removal of insolubles, heat sterilization (b) is carried out. This treatment can be carried out according to a known method. However, when the above heating (a) is effective for heat sterilization and inactivation of the enzyme though it is weak, conditions of this heating can be milder by taking into consideration of the effect of the heating (a). Suitably, this heating is carried out in such a degree that the enzyme remained in the soybean protein hydrolysate is substantially inactivated and a remaining viable count is 10 or less. Normally, it is preferred to carry out heating in excess of the above-described heating time, i.e., for longer than $10^{5.25-(0.05 \times T)}$ minutes (wherein T is heating temperature (° C.)).

The pH of the hydrolyzation mixture to be subjected to this heat sterilization (b) is preferably determined by a particular use of the end product and, normally, it is within the range of pH 3 to 8. When the hydrolysate of the present is used for neutral drinks, preferably, the end product is within pH 6 to 7. When the hydrolysate is used for acidic drinks, pH 3.5 to 4.5 is suitable. The degree of sterilization varies to some extent according to this pH. In case of weak acidic to neutral, sterilization of thermophilic anearobes such as Clostridium, etc. is required and, preferably, the heating is carried out in excess of, i.e., for longer than $10^{6.25-(0.05 \times T)}$ minutes. On the other hand, when the final pH is about 4.5 or lower, the heating time of $10^{6.25-(0.05 \times T)}$ minutes or shorter is sufficient because growth of almost all pathogenic bacteria, putrefactive bacteria and sporangia are hardly taken place.

The product resulted from the heat sterilization (b) can be stored as it is, or after concentration, by sealing in a container. Alternatively, the product can be dried and pulverized or atomized for storage.

EXAMPLES

The embodiments of the present invention are illustrated by the following Examples.

Example 1

An aqueous 0.9% solution (pH 7.0) of isolated soybean protein ("New Fuji Pro-R" manufactured by Fuji Oil, Co., Ltd.)(30 kg) was prepared and subjected to an enzymatic reaction with a proteolytic enzyme ("Protease S" manufactured by Amano Seiyaku K. K.) (1.2 kg) to hydrolyze the protein at 60° C. for 5 hours (15% TCA solubilization degree: 85%). Then, the hydrolyzation mixture was adjusted to pH 5.5 by addition of citric acid. Steam at 8 kg/cm$^2$ was blown into the mixture to raise its temperature to 95° C. and the mixture was held at this temperature for 1 minute (heating (a)). The mixture was cooled to 12° C. with a heat exchanger plate through which cooling water was passing, followed by centrifugation with a high-speed continuous centrifugal separator (SB-7 manufactured by WESTFALLIA SEPARATOR) by adjusting a feed rate to 100 L/hour to separate and remove a precipitate fraction formed. The precipitate fraction was sufficiently firm to retain it for 20 minutes until it was discharged. The resultant supernatant (yield of solids: 72.4%) was adjusted to pH 6.5 and sterilized at 150° C. for 1 minute (heat-sterilization (b)). Immediately after sterilization, the supernatant was spray-dried to obtain a dried powder. The resultant dried powder was dissolved in water at a concentration of 5%. When this solution was stored at 5° C. for 24 hours, dregs were not observed at all.

The above hydrolyzation mixture (10 cc) was collected in a graded centrifuge tube before heating (a) and adjusted its temperature to 25° C. and centrifuged at 1,500 G for 20 minutes. The volume of a sludge was 32% of that of the hydrolyzation mixture. By heating (a), the volume of a sludge was condensed to 10% of that of the hydrolyzation mixture.

Comparative Example 1

The First Heating Step was Omitted

According to the same manner as that described in Example 1, a dried powder was obtained except that the soybean protein solution adjusted to pH 5.5 was not subjected to the heat treatment, but was directly cooled to 12° C. with a heat exchanger plate, followed by centrifugation. In this case, the precipitate fraction formed in the centrifugal separator was insufficiently firm. Then, the fraction could be retained only for 5 minutes until it was discharged. The resultant dried powder was dissolved in water at a concentration of 5% and the solution was stored at 5° C. for 24 hours. Although dregs were not formed at all, the yield of solids of the supernatant was only 53.2%.

Comparative Examples 2 and 3

Heat Sterilization was Effected as the First Heating Step

According to the same manner as that described in Example 1, a dried powder was obtained except that the hydrolyzation mixture was raised to 95° C. and maintained at that temperature for 20 minutes, or raised to 80° C. and maintained at that temperature for 60 minutes instead of raising to 95° C. and maintaining at that temperature for 1 minute, and that heat sterilization was omitted. The volume of a sludge determined by adjusting the temperature to 25° C. and centrifuging at 1,500 G for 20 minutes was almost the same as that of Example 1. However, when the resultant dried powder was dissolved in water at a concentration of 5% and the solution was stored at 5° C. for 24 hours, dregs were clearly recognized with the naked eye in both cases.

Example 2 and Comparative Example 4

Cooling was Slow Cooling or Omitted

According to the same manner as that described in Example 1, a dried powder was obtained except that the hydrolyzation mixture was allowed to cool for 4 hours to room temperature and then centrifuged (Example 2), or was centrifuged directly without cooling (Comparative Example 4) instead of subjecting to heat treatment at 95° C. for 1 minute, cooling to 12° C. and then centrifugation.

The dried powder was dissolved in water at a concentration of 5% and stored at 5° C. for 24 hours. As a result, dregs were slightly formed in Example 1, whereas dregs were clearly formed in Comparative Example 4.

Example 3 and Comparative Examples 5 and 6

According to the same manner as that described in Example 1, a dried powder was prepared except that the hydrolyzation mixture was adjusted to pH 4.5 by addition of citric acid, the heating (a) was carried out by holding at 100° C. for 6 seconds, that the mixture was cooled to 15° C., that the centrifugation was carried out a continuous centrifugal separator (MD-10 manufactured by IshikawajimaHarima Heavy Industries Co., Ltd.) by adjusting a feed rate to 30 L/hour, and that the heat sterilization (b) was carried out at 125° C. for 10 seconds (Example 3). When the dried powder was dissolved in water at a concentration of 5% and stored at 5° C. for 24 hours, dregs were not formed at all.

The volume of a sludge determined before heating (a) by raising the temperature to 25° C. and centrifuging at 1,500 G for 20 minutes was 30% based on the volume of the hydrolyzation mixture, whereas the volume of a sludge determined after heating (b) was 10% based on the volume of the hydrolyzation mixture. The yield of the supernatant by continuous centrifugation was 65%.

The soybean protein was treated according to the same manner as that described in Example 3 except that the heating (a) was omitted (Comparative Example 5). However, separation with the continuous centrifugal separator was bad. In addition, according to the same manner as that described in Example 3, a dried powder was produced except that the heating (a) was carried out by holding at 104° C. for 5 minutes (Comparative Example 6). When the dried powder was dissolved in water at a concentration of 5% and stored at 5° C. for 24 hours, dregs were clearly formed.

Example 4 and Comparative Example 7

An aqueous 9% soybean protein solution (pH 7.0) was prepared by using the same isolated soybean protein as that in Example 1 (30 kg) and subjected to an enzymatic reaction with a proteolytic enzyme ("Protease M" manufactured by Amano Seiyaku K. K.) (E/S ratio=2%) in a continuous enzymatic reaction vessel for 2 hours. After addition of $CaSO_4$ in an amount 0.5% by weight based on the weight of the substrate, steam was blown into the hydrolyzation mixture so that the temperature was raised to 130° C. and heating (a) was stopped. The mixture was cooled to 15° C. with a heat exchanger plate through which cooling water was passing, followed by treatment with a continuous separator, a liquid cyclone (NHC-10 manufactured by Nippon Kagaku Kikai Seizo) by adjusting a feed rate to 400 L/hour to separate and remove insoluble components. The resultant supernatant was adjusted to pH 6.5 and sterilized at 150° C. for 1 minute. Immediately after sterilization, the supernatant was spray-dried to obtain a dried powder. The resultant dried powder was dissolved in water at a concentration of 5%. When this solution was stored at 5° C. for 24 hours, dregs were not formed at all.

As Comparative Example 7, the soybean protein was treated according to the same manner as that of Example 4 except that heating to 130° C. by blowing steam into the hydrolyzation mixture was omitted and the mixture was directly cooled to 15° C. However, the insoluble components could not be separated by using the liquid cyclone.

Effect of the Invention

According to the present invention, a precipitate formed after enzymatic decomposition of soybean protein is readily separated, thereby improving a yield. And, when the resultant enzymatic decomposition product is used for drinks, formation of dregs can be minimized.

What is claimed is:

1. A process for producing a soybean protein hydrolysate, which comprises:

(i) hydrolyzing an aqueous soybean protein solution with a proteolytic enzyme to form a hydrolyzed mixture, (ii) subjecting the hydrolyzed mixture to heating at 75 to 160° C. for $10^{5.25-(0.05 \times T)}$ minutes or less wherein T is the heating temperature (° C.) to form a heated hydrolyzed mixture, (iii) cooling the heated hydrolyzed mixture to 60° C. or less, (iv) separating and removing insolubles from the cooled mixture at a pH of 4.0–6.2 to obtain a supernatant, and (v) subjecting the supernatant to heat-sterilization, to obtain the soybean protein hydrolysate.

2. The process according to claim 1, wherein the hydrolyzing step is carried out so that the degree of hydrolysis is 20 to 98% in terms of a soybean protein decomposition rate expressed by a solubilization degree of a protein component in 15% trichloroacetic acid.

3. The process according to claim 1, wherein the insolubles are separated and removed by addition of an alkaline earth metal compound or a protein flocculating agent.

* * * * *